United States Patent
Kroner et al.

[11] Patent Number: 5,888,959
[45] Date of Patent: Mar. 30, 1999

[54] PREPARATION OF POLYCONDENSATES OF ASPARTIC ACID AND USE OF THE POLYCONDENSATES

[75] Inventors: Matthias Kroner, Eisenberg; Gunnar Schornick, Neuleiningen, both of Germany

[73] Assignee: BASF Aktiengesellschaft, Ludwigshafen, Germany

[21] Appl. No.: 776,709

[22] PCT Filed: Jul. 28, 1995

[86] PCT No.: PCT/EP95/03004

§ 371 Date: Feb. 12, 1997

§ 102(e) Date: Feb. 12, 1997

[87] PCT Pub. No.: WO96/05242

PCT Pub. Date: Feb. 22, 1996

[30] Foreign Application Priority Data

Aug. 12, 1994 [DE] Germany ............ 44 28 638.4

[51] Int. Cl.$^6$ .............. C08G 69/10; C11D 3/37; C02F 5/12; G08G 73/06
[52] U.S. Cl. .......... 510/361; 510/476; 510/490; 510/533; 525/418; 525/419; 525/420; 525/532; 525/539; 528/328; 528/363; 528/392
[58] Field of Search .............. 510/476, 361, 510/533, 490; 528/328, 363, 392; 525/418, 419, 420, 532, 539

[56] References Cited

U.S. PATENT DOCUMENTS

| | | | |
|---|---|---|---|
| 4,363,797 | 12/1982 | Jacquet et al. | 424/70 |
| 5,219,952 | 6/1993 | Koskan et al. | 525/419 |
| 5,221,733 | 6/1993 | Koskan et al. | 530/333 |
| 5,288,783 | 2/1994 | Wood | 525/418 |
| 5,367,047 | 11/1994 | Wood | 528/363 |
| 5,371,180 | 12/1994 | Groth et al. | 528/363 |
| 5,373,086 | 12/1994 | Koskan et al. | 528/328 |
| 5,508,434 | 4/1996 | Batzel et al. | 548/520 |
| 5,552,514 | 9/1996 | Adler et al. | 528/328 |
| 5,554,721 | 9/1996 | Adler et al. | 528/328 |
| 5,556,938 | 9/1996 | Freeman et al. | 528/328 |
| 5,574,113 | 11/1996 | Kroner et al. | 525/327.6 |
| 5,610,264 | 3/1997 | Wood et al. | 528/328 |
| 5,639,723 | 6/1997 | Kroner et al. | 510/476 |
| 5,665,693 | 9/1997 | Kroner et al. | 510/476 |

FOREIGN PATENT DOCUMENTS

| | | |
|---|---|---|
| 40 23 563 | 2/1962 | Germany . |
| 262 665 | 6/1987 | Germany . |
| 93/24661 | 12/1993 | WIPO . |

OTHER PUBLICATIONS

Journal of Medicinal Chemistry, 1973, vol. 16, No. 8, Philip S. Portoghese, Editor.

Primary Examiner—Mukund J. Shah
Assistant Examiner—Bruck Kifle
Attorney, Agent, or Firm—Oblon, Spivak, McClelland, Maier & Neustadt, P.C.

[57] ABSTRACT

Process for preparing polycondensates of aspartic acid by polycondensation of aspartic acid at from 140° to 300° C. in the presence of sulfuric acid which has been partially neutralized with ammonia and/or amines as catalyst, and use of the reaction mixtures obtainable in this way or of the reaction mixtures neutralized with alkali metal or alkaline earth metal bases as additive to phosphate-free or reduced phosphate detergents and cleaners.

12 Claims, No Drawings

PREPARATION OF POLYCONDENSATES OF ASPARTIC ACID AND USE OF THE POLYCONDENSATES

BACKGROUND OF THE INVENTION

Field of the Invention

The invention relates to a process for preparing polycondensates of aspartic acid by polycondensation of aspartic acid at from 140° to 300° C. in the presence of acidic catalysts and to the use of the reaction mixtures obtainable in the condensation as additive to phosphate-free or reduced phosphate detergents and cleaners.

DISCUSSION OF THE BACKGROUND

J. Med. Chem. 16 (1973) 893 discloses the polycondensation of aspartic acid in the presence of phosphoric acid. The molecular weight of the polycondensates depends on the ratio of aspartic acid to phosphoric acid.

DD-A-262 665 discloses the preparation of polyaspartimide by polycondensation of aspartic acid in the presence of, preferably, polyphosphoric acid and, where appropriate, subsequent further condensation of the polyaspartimide in solid phase at from 160° to 200° C.

In the process disclosed in DE-A-4 023 463, aspartic acid is polycondensed in the presence of phosphoric acid under pressures below 1 bar in at least 2 stages. The condensing agent used is phosphoric acid, phosphorus pentoxide or polyphosphoric acid. In the first stage of the process, mixtures of aspartic acid and condensing agent are polycondensed at from 100° to 250° C. to give polysuccinimides with molecular weights of about 10,000–100,000. The resulting compact, hard reaction mixture is subsequently comminuted mechanically and further condensed in a second polycondensation stage under the same temperature and pressure conditions as in the first stage.

The processes described above have the disadvantage that the phosphoric acid or polyphosphoric acid used as catalyst must be washed out of the polycondensate. A measure of this type is associated with considerable expense in industry. In addition, the phosphoric acid extracted from the polycondensates must be reconcentrated in order to be reusable as catalyst in the polycondensation.

WO-A-93/24661 discloses, inter alia, the preparation of polyaspartic acid and cocondensates of aspartic acid in the presence of inorganic acids. Apart from the acids of phosphorus which have been mentioned above, mention is made of hydrohalic acids, phosphorus acids in which the phosphorus has a lower oxidation state than plus 5, sulfuric acid, disulfuric acid, sulfur trioxide and sodium and potassium bisulfates.

SUMMARY OF THE INVENTION

It is an object of the present invention to provide a process for preparing polycondensates of aspartic acid in which polycondensates with a higher molecular weight than in the prior art are obtained.

We have found that this object is achieved by a process for preparing polycondensates of aspartic acid by polycondensation of aspartic acid at from 140° to 300° C. in the presence of acidic catalysts when sulfuric acid which is partially neutralized with ammonia and/or amines is used as catalyst.

DETAILED DESCRIPTION OF THE PREFERRED EMBODIMENTS

The aspartic acid which is polycondensed by the process according to the invention can be in the form of L-, D,L- or D-aspartic acid. Polycondensation can be carried out with aspartic acid of the desired crystal size. The diameter of fine-particle aspartic acid subjected to the polycondensation is, for example, from 0.01 to 5 mm.

The polycondensation of the aspartic acid is carried out at from 140° to 300°, preferably 150° to 240° C., in the presence of sulfuric acid which is partially neutralized with ammonia and/or amines. The molar ratio of sulfuric acid to ammonia and/or amines in the acidic ammonium bisulfates is, for example, from 1:0.5 to 1:1.5. The acidic catalyst which is preferably used is a partially neutralized sulfuric acid which is neutralized with from 0.8 to 1.2 mol of ammonia and/or amine per mol of sulfuric acid. Particularly preferred acidic catalysts have a molar ratio of sulfuric acid to ammonia and/or amines of 1:1. Ammonium bisulfate, trimethylammonium bisulfate and triethylammonium bisulfate are among the particularly preferred catalysts. All the partially neutralized sulfuric acids described above are called ammonium bisulfate hereinafter for simplicity.

The acidic catalysts in the form of ammonium bisulfates can be prepared using sulfuric acid in the form of dilute or concentrated sulfuric acid. Diluents which can be used for the sulfuric acid are all liquids miscible with sulfuric acid. Water is suitable and preferred. It is also possible to use organic diluents such as acetone, ethyl methyl ketone, methanol, ethanol, isopropanol, butanol, ethylene glycol, diethylene glycol, triethylene glycol, polyethylene glycols, polypropylene glycols, polybutylene glycols or polytetrahydrofurans.

Ammonia and amines are suitable as base for the partial neutralization of the sulfuric acid. Both primary, secondary and tertiary amines can be used as amines.

Examples of primary mono- and polyfunctional amines are $C_1$-$C_{30}$-alkylamines such as methylamine, ethylamine, propylamine, n-butylamine, sec-butylamine, tert-butylamine, pentylamines, hexylamine, cyclohexylamine, octylamine, 2-ethylhexylamine, tridecylamine, palmitylamine, stearylamine, oleylamine and 1,2-ethylenediamine, 1,2-propylenediamine, 1,3-diaminopropane, 1,4-diaminobutane, 1,6-diaminohexane, 1,8-diaminooctane, benzylamine, 2-phenylethylamine, neopentanediamine, diethylenetriamine, triethylenetetramine, tetraethylenepentamine, polyethyleneimine and polyvinylamine.

Examples of secondary amines are dimethylamine, diethylamine, di-n-propylamine, diisopropylamine, dibutylamine, diisobutylamine, di-sec-butylamine, di-2-ethylhexylamine, N-methylcyclohexylamine, N-ethylcyclohexylamine, dicyclohexylamine, ditridecylamine, morpholine, N-methyl-N-hexylamine, N-methyl-N-butylamine, N-ethyl-N-butylamine, piperidine and piperazine.

It is also possible to use polyfunctional amines which contain both primary amino groups and secondary or tertiary amino groups. Examples of such polyalkylenepolyamines are diethylenetriamine, triethylenetetramine, tetraethylenepentamine, polyethyleneimines, 1-diethylamino-4-aminopentane, 2-diethylaminoethylamine, dimethylaminopropylamine, N-methyl-1-methylaminopropane, 1-diethylamino-4-aminopentane, 3-(2-aminoethyl)aminopropylamine, dipropylenetriamine and bis(3-aminopropyl)ethylenediamine.

Examples of tertiary amines are trimethylamine, triethylamine, tripropylamine, tributylamine, tri-2-ethylhexylamine, dimethylcyclohexylamine, N,N-dimethylethylamine, N,N-dimethylisopropylamine, N-methylmorpholine, N-ethylmorpholine, N-laurylmorpholine, tetramethylethylendiamine, tetramethyl-1,3-propanediamine, tetramethyl-1,6-hexanediamine, pentamethyldiethylenetriamine, hexamethyltriethylenetetramine, heptamethyltetraethylenepentamine, dimethyl-$C_8/C_{12}$-amine, dimethyl-$C_{12}/_{14}$-amine, N-methylpiperidine and dimethylpiperazine.

The amines may also be heterocyclic or aromatic. Examples are pyridine, collidine, lutidine, aniline, N-methylaniline, N,N-dimethylaniline, imidazole, N-methylimidazole and Michler's base (tetramethyl-4,4'-diaminodiphenylmethane).

The amines may also contain other functional groups, for example carboxylic acid, ester, alcohol or ether moieties. Examples of such amines are alkanolamines such as ethanolamine, diethanolamine, propanolamine, dipropanolamine, tripropanolamine, isopropanolamine, diisopropanolamine, triisopropanolamine, N,N-dimethylethanolamine, N,N-diethylethanolamine, N,N-diisopropylethanolamine, 1,2-butanolamines, dibutanolamine, tributanolamine, N-methyldiisopropanolamine and 3-dimethylaminopropanol. The OH groups in the alkanolamines may be etherified or esterified. Examples of amines containing ether and ester moieties are 2-methoxyethylamine, 2-ethoxyethylamine, 2-acetoxyethylamine, 3-methoxypropylamine, 3-ethoxypropylamine, 3-(2-ethylhexoxy)propylamine, 3-(2-methoxyethoxy)propylamine, di-2-methoxyethylamine, di-2-ethoxyethylamine, di-2-acetoxyethylamine, tri-2-methoxyethylamine, tri-2-acetoxyethylamine, tetramethyl-2,2'-diaminodiethyl ether, 4,9-dioxadodecane-1,12-diamine and 4,7,10-trioxatridecane-1,13-diamine.

Examples of amines containing carboxylic acid moieties are N,N-dimethylamino acids, N,N-dimethylglycine, nitrilotrieacetic acid and ethylenediaminetetraacetic acid.

Amines which contain several basic nitrogen atoms are used in an amount based on sulfuric acid such that the resulting ammonium salts when dissolved in water have a pH not exceeding 7, preferably below 5.

The salts preferably used as acidic catalysts have a molar ratio of sulfuric acid to ammonia and/or amines of 1:1. Particularly preferred as acidic catalyst are salts obtainable by partial neutralization of sulfuric acid with ammonia, trimethylamine or triethylamine, and ammonium bisulfate (molar ratio of sulfuric acid to ammonia, trimethylamine or triethylamine of 1:1) is particularly preferably used as acidic catalyst.

The polycondensation of the aspartic acid can be carried out as solid-phase condensation or as solution polycondensation. If, for example, up to 0.7 mol of ammonium bisulfate is used in the polycondensation of 1 mol of aspartic acid, the reaction takes place in solid phase to result in reaction mixtures in the form of powders. If, however, more than 0.7 mol of ammonium bisulfate is used per mol of aspartic acid in the polycondensation, the ammonium bisulfates act as solvents for aspartic acid and polyaspartimide so that the polycondensation takes place in the form of a melt polycondensation. The polycondensation can also be carried out in a solvent, eg. in polyethylene glycol with a molecular weight of 150–20,000, preferably 300–10,000.

Sulfuric acid which is partially neutralized with ammonia and/or amines for use according to the invention as acidic catalyst can be prepared, for example, by mixing ammonia and/or amines and sulfuric acid in the presence or absence of aspartic acid. If the ammonium bisulfates are not directly available, for example a 10–50% strength aqueous sulfuric acid can be partially neutralized with an anhydrous or aqueous solution of an amine. It is also possible to pass ammonia or gaseous amines into the aqueous solution of sulfuric acid. Fine-particle aspartic acid can be suspended in the ammonium bisulfate solutions obtainable in this way, and the water can be distilled off. Another possibility comprises spraying an aqueous solution of an ammonium bisulfate onto fine-particle aspartic acid.

Another variant for carrying out the polycondensation in the presence of sulfuric acid which has been partially neutralized with ammonia and/or amines comprises aspartic acid first being impregnated with sulfuric acid and subsequently exposed to ammonia and/or amines. In another variant for preparation of the catalyst, aspartic acid is first impregnated with ammonia and/or amines, and sulfuric acid is subsequently added.

Ammonium bisulfates of organic amines generally have low melting points. For example, trimethylammonium bisulfate melts at 70°–75° C. It is therefore possible to spray a melt of organic ammonium bisulfates which is anhydrous or has a low water content onto aspartic acid crystals.

The preparation of the acidic catalyst and the mixing of the aspartic acid with the ammonium bisulfates can take place, for example, at from 0° to 200° C. If a solution of ammonium bisulfate in water is added to polyaspartic acid at a temperature above 140° C., preferably from 170° to 200° C., the water is distilled off and the acidic catalyst is deposited on the surface of the aspartic acid crystals. The actual polycondensation of the aspartic acid may take place at the same time as the mixing of aspartic acid and catalyst and the distilling off of the water. In order to avoid caking during the polycondensation, the polycondensation can be carried out in the presence of nonionic, anionic, cationic surfactants, long-chain carboxylic acids or mixtures of mutually compatible nonionic and cationic or nonionic and anionic surfactants. The amounts of surfactants normally used are from 1 to 20% of the weight of aspartic acid.

Aspartic acid impregnated with ammonium bisulfates starts to polycondense with formation of water as soon as the temperature exceeds 140° C. The reaction mixture passes through a brief sticky phase in which the individual aspartic acid crystals stick to one another. This takes place when the temperature has reached about 150°–160° C. and is evident from a high power consumption of the stirrer. After a polycondensation time of 15–20 minutes at 140°–160° C., the power consumption becomes less and the reaction mixture becomes powdery again and is free-flowing and completely non-adhesive. The reaction mixture has again become easily stirrable and free-flowing after 30 minutes. However, the polycondensation is not yet complete at this time. Various degrees of polycondensation can be obtained by stopping the polycondensation at this stage. Continuation of the polycondensation can then be carried out in the powdered state at higher temperatures.

The molar ratio of aspartic acid to partially neutralized sulfuric acid is, for example, from 1:0.01 to 1:3 and is preferably in the range from 1:0.05 to 1:1.5. The polycondensation of aspartic acid is preferably continued until from 1 to 2 mol of water of condensation per 1 mol of aspartic acid has been distilled out of the polymerizing mixture. However, the polycondensation can also be stopped when less than 1 mol of water of condensation has formed. In such cases the polycondensates may still contain residues of free aspartic acid. If, for example, from 0.7 to 1.2 mol of water of condensation is distilled out of the reaction mixture per mol of aspartic acid, the resulting condensates contain predominantly polyaspartic acid. If, by contrast, the polycondensation is continued until from 1.2 to 1.7 mol of water are formed per mol of aspartic acid used, the resulting polycondensates contain polyaspartimide units in addition to polyaspartic acid. If more than from 1.7 to 2 mol of water are distilled out of the reaction mixture per mol of aspartic acid in the polycondensation, the polycondensates are composed predominantly of polyaspartimides.

The temperatures at which the polycondensation essentially takes place are from 140° to 300°, preferably 150° to 250° C. The particularly preferred temperature range for the polycondensation of aspartic acid is from 160° to 230° C. As the temperature increases the reaction becomes faster and thus the holdup times decrease.

Ammonium bisulfates have a lower melting point than sodium or potassium bisulfate whose use has been disclosed. Ammonium bisulfate melts at 147° C. and triethylammonium bisulfate at 70°–75° C. Under the polycondensation conditions, the ammonium bisulfates are present in liquid form so that, because of the solubility of aspartic acid in the ammonium bisulfates, the polycondensation can be carried out in a homogeneous melt. If stoichiometric amounts of ammonium bisulfate are chosen, the polycondensation of aspartic acid can be carried out in the form of a melt condensation. Such homogeneous reaction melts are processed in apparatus customary for polycondensation, such as thin-film reactors, extruders, stirred vessels or heated conveyor belts.

Examples of suitable apparatus for impregnating the aspartic acid with the ammonium bisulfates are fluidized bed reactors, paddle driers, kneaders and spraying devices. If a sticky phase occurs during the polycondensation, the apparatus used will have a powerful mechanical mixing device, for example kneaders, paddle driers, ball mills or extruders. When the polycondensation has passed through a sticky phase, the further condensation is expediently carried out, for example, in apparatus customary for processing easily agitated powders, eg. heatable conveyor belts, rotary tube furnaces, downflow tower or drums.

After the polycondensation is complete, the ammonium bisulfates used as acidic catalyst may remain in the polycondensate or, if necessary, be removed from the reaction mixture by extraction with water. The water-soluble ammonium bisulfates can be removed after the polycondensation for example by countercurrent treatment of the powdered polycondensate with water in an extraction tower. The extraction can also take place by spraying water onto the polycondensate on a filtration belt. The residual contents of ammonium bisulfates in the polycondensate are determined by the effort put into the extraction. The polycondensates resulting from the polycondensation can be used either directly or after removal of ammonium bisulfates as additive to phosphate-free or reduced phosphate detergents and cleaners. Reduced phosphate detergents and cleaners mean those formulations whose phosphate content, calculated as trisodium phosphate, is below 25% by weight.

The mixtures resulting from the polycondensation may, however, also be hydrolyzed. The use of hydrolyzed polycondensates of aspartic acid is preferred. The hydrolysis can be carried out with alkali metal bases such as sodium hydroxide, potassium hydroxide, potassium carbonate or sodium carbonate or with alkaline earth metal bases such as magnesium oxide, magnesium hydroxide, calcium oxide and calcium hydroxide. The polycondensates may moreover be partially or completely converted into the alkali metal and/or alkaline earth metal salts.

A preferred embodiment of the hydrolysis of the polycondensates of aspartic acid comprises simultaneous removal of the amine component from the ammonium bisulfates. This is done by suspending the reaction mixture for example in water and hydrolyzing by addition of, for example, sodium hydroxide solution, there being consumption of sodium hydroxide solution to neutralize the ammonium bisulfate. The amount of sodium hydroxide solution depends on the amount of ammonium bisulfate present in the reaction mixture, with up to 2 mol of sodium hydroxide being required per mol of ammonium bisulfate.

The hydrolysis with sodium hydroxide solution takes place at from 0° to 140° C. Hydrolysis at above 100° C. is carried out in pressure-tight apparatus. The hydrolysis can preferably be carried out in such a way that the liberated amine or the liberated ammonia is removed from the reaction mixture by distillation. The hydrolysis can be carried out, for example, under atmospheric pressure if it is intended to remove a low-boiling amine or low-boiling ammonia from the mixture to be hydrolyzed. The amines may, however, also be removed from the reaction mixture by distillation under reduced pressure. The amine liberated in the hydrolysis or the ammonia may also be driven out of the reaction mixture using a stream of inert gas or using steam. The residue obtained from the distillation on use of sodium hydroxide solution is, for example, a solution of the sodium salt of polyaspartic acid which is virtually free of ammonia or amine. In order to remove the amines completely, the pH is preferably adjusted to a value at which the amine is at least 50% in non-protonated form. The minimum pH for this is determined by the base strength of the amines and is preferably above the pKa. Thus, the pH for ammonia is, for example, more than 9.2, for triethylamine is more than 10, for trimethylamine is more than 9.8 and for pyridine is more than 5.2.

Residual amounts of amines in the aqueous solutions of the salts of polyaspartic acid can also be removed using an oxidizing agent. Suitable oxidizing agents are hydrogen peroxide, ozone, sodium hypochlorite, oxygen, organic peroxides or nitric acid. In this case the amines are converted into the corresponding amine N-oxides which have a neutral odor and act as bleaches in detergent liquors. The sulfate content of the polyaspartic acid salt solution does not interfere with the intended use. Reaction mixtures of this type are likewise used as additive to phosphate-free or reduced phosphate detergents and cleaners.

A particularly economic process for preparing aspartic acid comprises enzyme-catalyzed addition of ammonia onto fumaric acid. The ammonium aspartate solution which is the initial product of this is mixed with the required amount of sulfuric acid so that, for example, the molar ratio of sulfuric acid to ammonia is from 1:0.5 to 1:1.5, and then evaporated to dryness and polycondensed. The reaction mixture obtained in the polycondensation is subsequently hydrolyzed by adding sodium hydroxide solution, and ammonia is evaporated out of the sodium polyaspartate solution and can be returned to the process.

The polyaspartic acids obtainable by hydrolysis after the process according to the invention have K values (determined by the Fikentscher method in 1% by weight solution at pH 7 and 25° C. on the sodium salt of the polymers) of from 10 to 150. The molecular weights $M_w$ of the resulting polyaspartic acids are from 1000 to 200,000. The polyaspartic acids obtainable with ammonium bisulfates as catalyst have higher molecular weights than polyaspartic acids obtainable with sodium or potassium bisulfate as catalyst. The polyaspartic acids obtainable by the process according to the invention are more than 75% biodegradable in the Zahn-Wellens test. The biodegradation is evident from the decrease in the dissolved organic carbon in the test solution.

The reaction mixtures obtainable by the process according to the invention, or the reaction mixtures neutralized with alkali metal or alkaline earth metal bases, are used as additive to the phosphate-free or reduced phosphate detergents and cleaners. The amounts of polycondensates used in the detergent formulations are, for example, from 1 to 40, preferably 2 to 30%, by weight. The detergents and cleaners contain as further ingredients surfactants in an amount of from 1 to 50% by weight and, where appropriate, builders, eg. copolymers of maleic acid and acrylic acid with molecular weights of from 40,000 to 150,000, or zeolites. The composition of detergent and cleaner formulations varies very widely so that accurate statements about this cannot be made. The detergents may additionally contain other substances such as bleaches, complexing agents, opacifying agents, optical brighteners, enzymes, perfume oils, color-transfer inhibitors and/or antiredeposition agents.

Unless otherwise stated in the Examples, the percentage data are by weight. The K values were determined by the method of H. Fikentscher, Cellulose-Chemie, 13 (1932) 58–64 and 71–74 in one percent strength aqueous solution at 25° C. and pH 7 on the sodium salt of the polyaspartic acids.

EXAMPLE 1

200 g of water are introduced into a reactor which has a capacity of 2 liters and is equipped with an anchor stirrer and a distillation head, and 9.8 g (0.1 mol) of sulfuric acid and then 10.1 g (0.1 mol) of triethylamine are added. Subsequently 133 g (1 mol) of aspartic acid (particle size 0.1–2 mm) are introduced into the stirred solution. The reaction mixture is evaporated to dryness under water pump vacuum in a heating bath at 120° C., and the residue is subsequently polycondensed in a heating bath at 180° C. under 16 mbar. During this, the reaction mass melts and then solidifies. The solidified reaction mass is mechanically comminuted (particle diameter about 1–5 mm) and heated at 180° C. for 6 hours. After the powder has cooled, 1 liter of water is added to the polycondensate, and the suspension is stirred at 0° C. for 2 hours. The polycondensate is then filtered off, washed twice with 2 liters of water and subsequently dried and weighed. The yield of colorless polyaspartimide is 81 g (83.5% of theory). The K value of the polycondensate in the sodium form is 30.9.

EXAMPLE 2

200 g of water are introduced into the apparatus described in Example 1, and subsequently 29.4 g (0.3 mol) of sulfuric acid and 30.3 g (0.3 mol) of triethylamine are added. Subsequently 133 g (1 mol) of aspartic acid are introduced into this solution, and the reaction mixture is evaporated to dryness and polycondensed as described in Example 1. An insoluble residue of 99.8 g is obtained. The K value of the sodium salt of the polyaspartic acid is 42.5.

EXAMPLE 3

9.8 g (0.1 mol) of sulfuric acid and 6.8 g (0.1 mol) of 25% strength aqueous ammonia solution are added to 200 g of water in the apparatus described in Example 1, and 133 g (1 mol) of aspartic acid are added. The water is removed and the residue is polymerized as described in Example 1. 80.5 g (83% of theory) of colorless polyaspartimide are obtained. The K value of the sodium salt of the polyaspartic acid obtainable from the polycondensate is 22.5.

EXAMPLE 4

200 g of water, 29.4 g (0.3 mol) of sulfuric acid and 20.4 g (0.3 mol) of 25% strength aqueous ammonia solution are mixed in the apparatus indicated in Example 1, and 133 g (1 mol) of aspartic acid are added. After the water has been removed by distillation, the residue is polycondensed as indicated in Example 1. The yield is 95.2 g (98.1% of theory) of polysuccinimide. The K value of the sodium polyaspartate obtainable therefrom by hydrolysis with sodium hydroxide solution is 27.3.

EXAMPLE 5

Example 2 is repeated with the exception that after polycondensation for 6 hours the complete reaction mass is suspended in water, and sodium hydroxide solution is added while monitoring the pH until the polycondensate has dissolved. Beside the solution of the sodium salt of polyaspartic acid, a triethylamine layer of lower specific gravity has formed. The aqueous phase is extracted twice with 200 ml of ethyl acetate. Residues of volatile organic constituents can be removed from the aqueous solution by blowing out with air or nitrogen.

EXAMPLE 6

Example 2 is repeated with the exception that after polycondensation for 6 hours the reaction mass is suspended in water, and sodium hydroxide solution is added while monitoring the pH of the solution until the polycondensate has dissolved. The organic phase is removed by distillation under water pump vacuum in a rotary evaporator at a bath temperature of 50° C. A virtually amine-free aqueous solution of sodium polyaspartate is obtained.

EXAMPLE 7

131.3 g (1 mol) of 45% strength aqueous trimethylamine solution are added in small portions to 392 g of 25% strength sulfuric acid (1 mol) in a round-bottom flask with a capacity of 1 liter in such a way that no amine escapes. Subsequently 133 g (1 mol) of aspartic acid are added, and the reaction mixture is evaporated to dryness under water pump vacuum in a rotary evaporator at 70° C. The temperature is then increased to 170° C. As soon as this temperature is reached, the aspartic acid dissolves to give a clear melt and the polycondensation starts. Polycondensation is carried out at 170° C. for 1 hour, and subsequently the reaction mixture is cooled and 600 ml of water are added. After extraction of the melt with water, the polycondensate is dried. The yield of polysuccinimide is 95.1 g (98% of theory). The K value of the sodium salt of the hydrolyzed polysuccinimide is 71.2 ($M_W$=50,000).

EXAMPLE 8

131.3 g of 45% strength trimethylamine solution are added to 392 g of 25% strength sulfuric acid as described in Example 7, and the mixture is concentrated under water pump vacuum at 70° C. until no more water escapes. Then 133 g of aspartic acid are added and the reaction mixture is heated to 170° C. The resulting homogeneous reaction mixture is polycondensed at 170° C. for one hour and worked up as in Example 7. The K value of the sodium polyaspartate obtainable by hydrolysis from the polycondensate is 73.9.

Comparative Examples 1 to 6

Amounts of sulfuric acid and, where appropriate, sodium hydroxide or potassium hydroxide indicated in Table 1 are mixed in the apparatus indicated in Example 1. The polycondensation is subsequently carried out by the method indicated in Example 1, and the reaction mixture is worked up correspondingly in each case. The results obtained from this are indicated in Table 1.

| Comparative Example | Water | Sulfuric acid | Alkali metal hydroxide 50% strength solution | Yield | K value |
|---|---|---|---|---|---|
| 1 | 200 g | 9.8 g (0.1 mol) | — | 74.7 g 77% of th. | 20.7 |
| 2 | 200 g | 29.4 g (0.3 mol) | — | 88.9 g 91.7% of th. | 20.5 |
| 3 | 200 g | 9.8 g (0.1 mol) | 11.4 g (KOH) (0.1 mol) | 73.6 g 76% of th. | 17.5 |
| 4 | 200 g | 29.4 g (0.3 mol) | 34.2 g (KOH) (0.3 mol) | 94.6 g 97.6% of th. | 25.9 |
| 5 | 200 g | 9.8 g (0.1 mol) | 8.0 g (NaOH) (0.1 mol) | 72.7 g 75% of th. | 18.1 |
| 6 | 200 g | 29.4 g (0.3 mol) | 24.0 g (NaOH) (0.3 mol) | 87.3 g 90% of th. | 24.3 |

Comparison of the results of the Comparative Examples with the results of Examples 1 to 4 makes it clear that on use of 10 mol %, and particularly on use of 30 mol %, of ammonium bisulfates the molecular weights of the polycondensates are increased compared with the Comparative Examples of the same amount of catalyst. Very high molecular weights and spectroscopically very pure polysuccinimides are obtained with stoichiometric amounts of ammonium bisulfates.

Comparative Example 7

133 g of aspartic acid are heated in a round-bottom flask with a capacity of 1 liter under a stream of nitrogen at 180° C. for 6 hours. After cooling, the reaction product is suspended without further purification in water and hydrolyzed by adding sodium hydroxide solution to pH 9–10. The K value of the sodium polyaspartate obtainable in this way is 9.6.

In contrast to polymerization in the presence of ammonium salts of sulfuric acid to be used according to the invention, under comparable reaction conditions (temperature, time) without catalyst there is virtually no polycondensation of aspartic acid.

EXAMPLE 9

An ammonium aspartate solution is prepared in a reactor with a capacity of 2 liters by suspending 133.1 g (1 mol) of aspartic acid in 500 g of water with stirring and adding 68 g (1 mol) of 25% strength aqueous ammonia solution. The resulting clear solution corresponds to the composition of an ammonium aspartate solution as produced by enzymatic addition of ammonia onto fumaric acid after removal (stripping) of excess ammonia. 98 g of concentrated sulfuric acid are added to the solution over the course of 30 minutes, during which the aspartic acid precipitates. The complete suspension is evaporated to dryness under water pump vacuum while stirring at 130° C., and the thick melt remaining as residue is polycondensed for 4 hours under water pump vacuum at 180° C. to form a foam. The solidified foam is broken up at intervals to produce powder particles 0.1–5 mm in size. After cooling, the polycondensate is taken up in 2 liters of water. The residue is filtered off and washed with water and dried at 70° C. The yield of polyaspartimide is 96.6 g (99.6% of theory). The K value of the sodium polyaspartate is 35.9.

EXAMPLE 10

The polycondensation is carried out as described in Example 9. After the powder has cooled, 200 g of water are added, and 25% strength sodium hydroxide solution is added while monitoring the pH in the range from 8 to 10 until the polycondensate has dissolved to a clear solution. The solution is distilled in a rotary evaporator under water pump vacuum at 40° C. until ammonia is no longer detectable in the distillate. It is necessary to add water to the contents of the flask at intervals. The resulting polycondensate solution is adjusted to a solids content of 40% by weight. The K value of the sodium polyaspartate is 30.3.

We claim:

1. A process for preparing polycondensates of aspartic acid, comprising:

polycondensing aspartic acid at a temperature of 140°–300° C. in the presence of a catalyst of sulfuric acid partially neutralized with ammonia and/or an amine.

2. The process as claimed in claim 1, wherein the molar ratio of sulfuric acid to ammonia and/or amine of said catalyst ranges from 1:0.5 to 1:1.5.

3. The process as claimed in claim 1, wherein the partially neutralized sulfuric acid is sulfuric acid neutralized with from 0.8 to 1.2 mol of ammonia and/or amine per mole of sulfuric acid.

4. The process as claimed in claim 1, wherein the molar ratio of sulfuric acid to ammonia and/or amine is 1:1.

5. The process as claimed in claim 1, wherein said partially neutralized acidic catalyst is ammonium bisulfate, trimethylammonium bisulfate or triethylammonium bisulfate.

6. The process as claimed in claim 1, wherein the molar ratio of aspartic acid to partially neutralized sulfuric acid ranges from 1:0.01 to 1:3.

7. The process as claimed in claim 6, wherein said molar ratio ranges from 1:0.05 to 1:1.5.

8. The process as claimed in claim 1, wherein said temperature ranges from 150°–240° C.

9. A method of preparing a phosphate-free or reduced phosphate detergent or cleaner comprising:

blending the polycondensate product produced by the process of claim 1, with the active ingredients of said detergent or cleaner formulation.

10. The method of claim 9, wherein the polycondensation product is neutralized with an alkali metal or alkaline earth metal base.

11. A polycondensate produced by the process of claim 1.

12. A phosphate-free or reduced phosphate detergent or cleaner composition, comprising a phosphate-free or reduced phosphate detergent or cleaner and the polycondensate of claim 11.

* * * * *